United States Patent [19]
Pozzetti

[11] 3,785,091
[45] Jan. 15, 1974

[54] DEVICE FOR DETECTING THE SPEED OF REMOVAL OF THE CHIPS IN A GRINDING MACHINE

[75] Inventor: Mario Pozzetti, Bologna, Italy

[73] Assignee: Finike Italiana Marposs-Soc. In Accomandita Semplice de Mario Possati & C., Bentivoglio, Italy

[22] Filed: Jan. 19, 1972

[21] Appl. No.: 219,016

[30] Foreign Application Priority Data
Jan. 20, 1971 Italy.................................. 3312/71

[52] U.S. Cl.............. 51/165 R, 51/165.91, 318/561
[51] Int. Cl............................................ B24b 49/04
[58] Field of Search..................... 51/165 R, 165.83, 51/165.91; 318/561

[56] References Cited
UNITED STATES PATENTS
2,895,264  7/1959  Lillie................................ 51/165 R
3,694,970  10/1972  Schoonover.................. 51/165.91 X FOREIGN PATENTS OR APPLICATIONS
755,052  8/1956  Great Britain................... 51/165.91

*Primary Examiner*—Harold D. Whitehead
*Attorney*—Stevens, Davis, Miller & Mosher

[57] ABSTRACT

A device for detecting the speed of removal of the chip from a workpiece in a grinder comprising a measuring member adapted to detect at each moment the dimension of the part being machined, and characterized by first memory means for memorizing a first dimension of the piece being worked, second memory means for memorizing the second dimension of the piece at a predetermined period of time from the detection of said first dimension, and means for forming the difference between the two memorized values, said difference representing the quantity of material removed in said predetermined interval of time.

6 Claims, 5 Drawing Figures

DEVICE FOR DETECTING THE SPEED OF REMOVAL OF THE CHIPS IN A GRINDING MACHINE

The present invention relates to a device for detecting the speed of removal of the chips from a workpiece in a grinding machine comprising a measuring member adapted to determine at each moment the size of the workpiece.

In the machining of workpieces with grinders, it is particularly important to properly regulate the speed of removal of the chips since both the shape of the workpiece and the quality of the surface of the workpiece depend on this adjustment. Furthermore, by optimizing the speed of removal, the machining times are also reduced.

In particular this verfication is important in the cycle which is carried out at the end of the finishing operation when the advance of the wheel is stopped, the wheel, however, being left in contact with the workpiece so as to continue the work in order to take up any possible irregularities in the workpiece.

This operation, particularly in modern high-speed grinders, is effected at the end of the various phases of roughing since it has been found that only in this way is it possible to obtain workpieces of the desired shape.

The main problem which arises in this case is that of controlling the duration of these operations. If the operation is too short, one obtains workpieces which are not of the desired shape and which have excessive surface irregularities.

If the operation is too long, the output of the machine is undersirably decreased.

The problem has been solved up to now by statistical criteria, namely by establishing an average time for this operation and programming the machine in such a manner as to continue the machining or stop after said predetermined fixed period of stoppage of the advance of the wheel. It is obvious that this system does not make it possible completely to solve the problem both because in each case certin workpieces are not brought to the desired conditions and because, when changing the type of workpiece, it would be necessary each time to recalculate the duration of the operation.

The technical problem which the present invention proposes to solve is that of determining at each moment the speed of removal of the chip of a grinder so as to be able possibly to control the cycle thereof.

The device in accordance with the invention solves this problem, it being characterized by first memory means for memorizing a first dimension of the workpiece being machined, second memory means for memorizing a second dimension of the workpiece at a predetermined interval of time after the detection of said first dimension and means for determining the difference between the two values memorized, said difference representing the quantity of material removed in said predetermined period of time.

The following description sets forth a preferred embodiment of the invention, given by way of illustration and not of limitation, with reference to the accompanying drawings in which:

FIG. 1. is a basic diagram of the operation of the control device in accordance with the invention;

FIG. 2. shows a part of a control device in accordance with the invention;

FIG. 4 shows a diagram of a combination of FIGS. 2 and 3;

Figure 1:
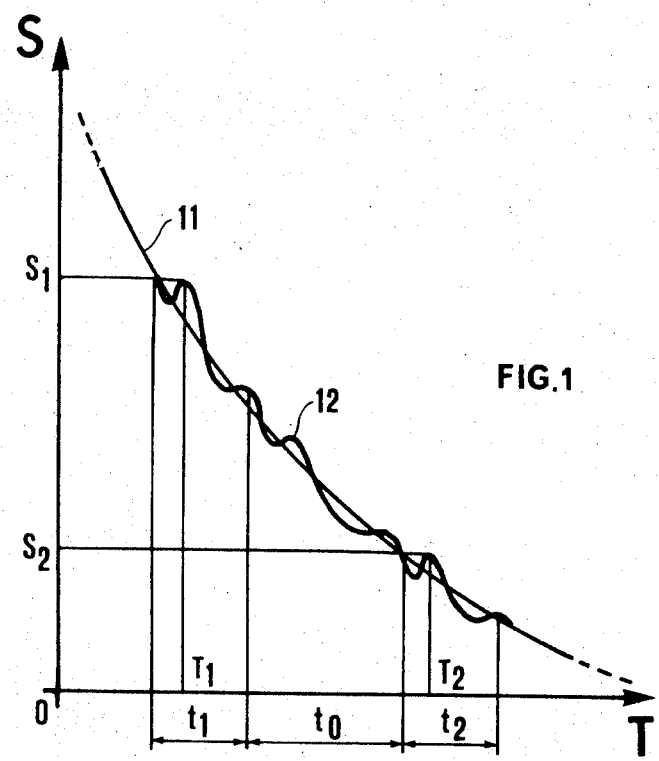

Referring to FIG. 1 in which the time T is plotted on the abscissa and the dimensions of the excess metal S to be removed are plotted on the ordinates, it is seen that the excess metal has on the average a decreasing course indicated by 11 in FIG. 1.

Since the workpiece does not have exactly the same size at each point, there is superimposed on the curve 11 a curve which represents substantially the shape of the workpiece, which thus gives rise to a curve 12. By operating the grinder with the wheel stationary, these variations tend to decrease since the removal of material at the more protruding points will be greater than at the other points.

The detection of the speed of removal is effected in principle by detecting the dimensions of the workpiece at two moments located a predetermined period of time apart. The difference between these two values referred to the period of time gives the speed of removal of the chip.

By proceeding in this manner, it may happen that of the two values detected, one happens to fall on a maximum and the other on a minimum of the curve 12 so that the difference between the two values S detected will be substantially different from the actual quantity of material removed.

This further problem has been solved by detecting, instead of the values at given moments, the maximum values over a period of time sufficient to permit the measurement member to explore the entire surface of the workpiece. In this way the difference between the values detected corresponds precisely to the quantity of material removed.

Figure 2:
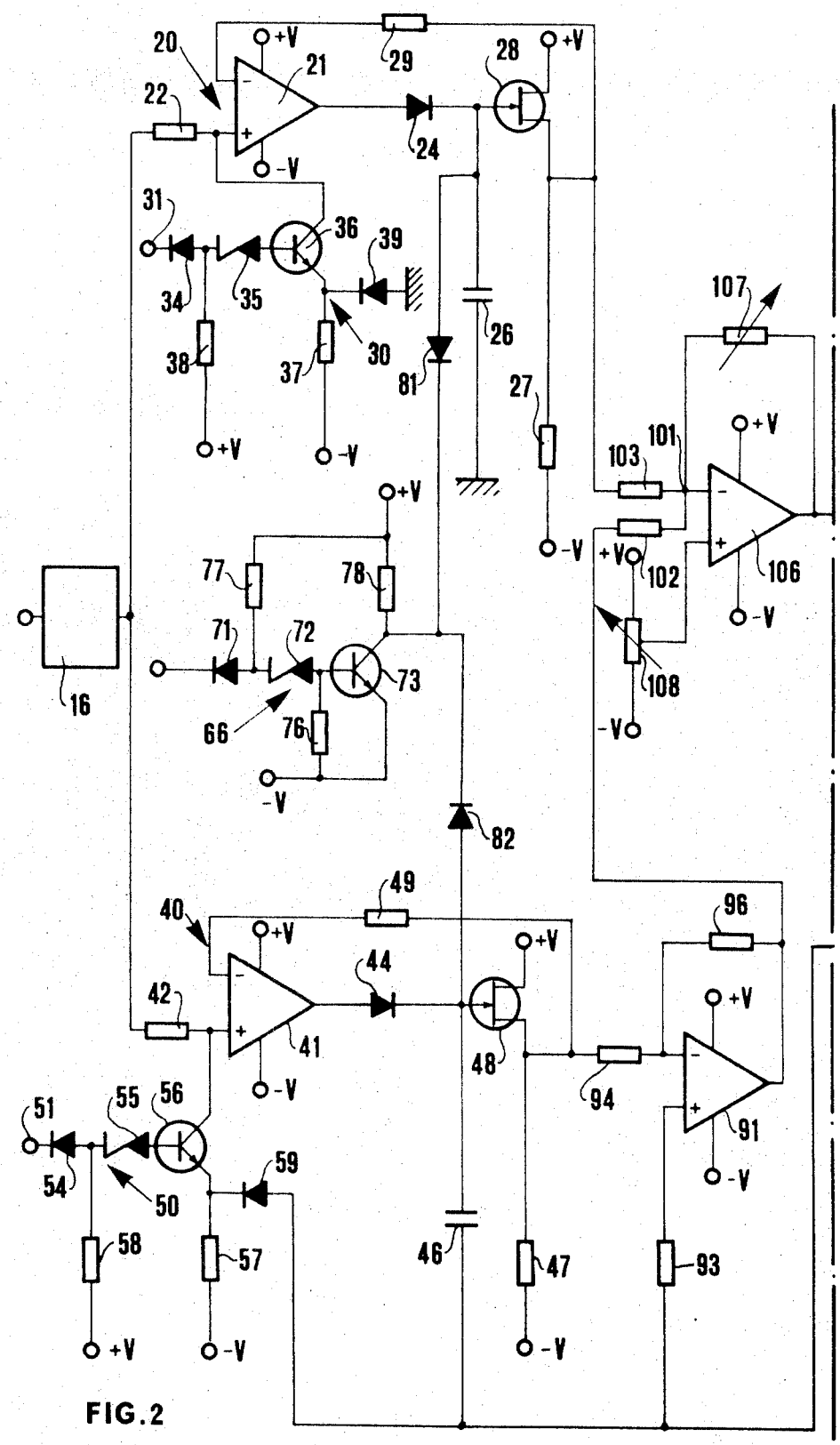
Figure 3:
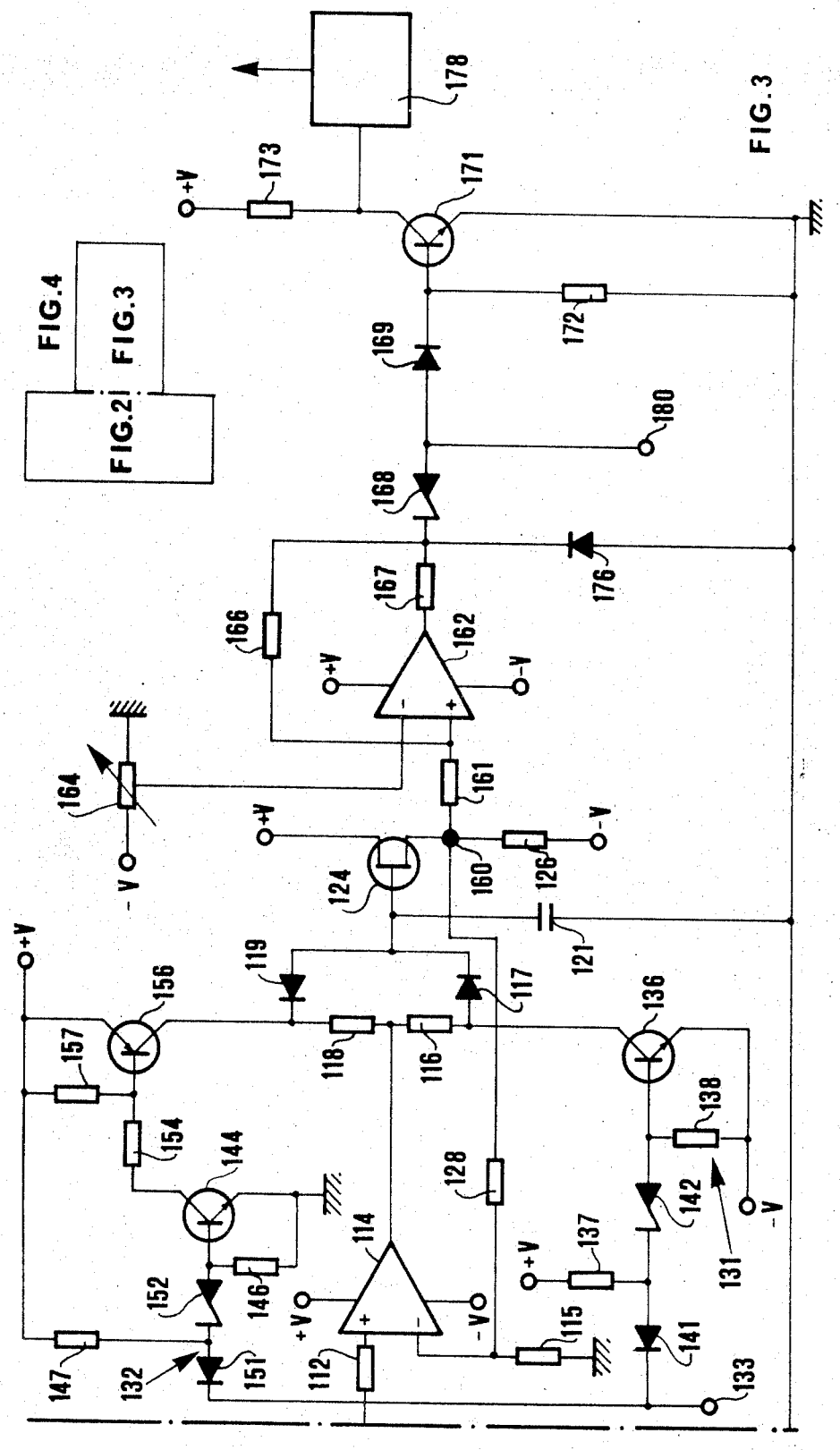
FIG. 3 shows a second part of the device in accordance with the invention.

This operation is carried out by the circuit illustrated in FIGS. 2 and 3. The signal coming from the measurement member is filtered in order partially to eliminate the irregularities of the workpiece, by a low-pass filter 16. The signal at the output of the filter 16 is introduced into the input of a circuit 20 adapted to memorize the maximum value which occures within a given time interval.

The circuit 20 comprises an operational amplifier 21 fed by the voltages $+V$ and $-V$. The signal coming from the filter 16 enters the positive input of the amplifier 21 through a resistor 22; the output of amplifier 21 charges a capacitor 26 through a diode 24. The voltage at capacitor 26 is applied to the input of an FET 28, fed by the voltages $+V$ and $-V$ and biased by a resistor 27. The FET 28 is connected so as to function as a cathode follower and its output is connected to the negative input of the amplifier 21 through a feedback resistor 29 adapted to assure that the amplifier 21 has a gain of unity. If the signal at the input of the amplifier 21 increases, the capacitor 26 is charged practically to a value equal to that at the input, the gain of the amplifier 21 being one. When the signal at the input decreases, the absolute value of the voltage on the negative input of the amplifier 21 is greater than that of the positive input since the capacitor 26 retains the charge corresponding to the preceding signal. The output of the amplifier 21 becomes negative and reverse biases the diode 24, preventing the capacitor 26 from discharging and then being charged to the new value of the signal. It is therefore obvious that the capacitor 26 always memorizes the maximum value of the signal. The positive input of the amplifier 21 is controlled by a circuit 30 to the input 31 of which there is applied a signal 32 (FIG. 5) coming from a control unit known per se and not shown in the drawing. The control signal is applied to the base of a transistor 36 through diode 34 and a Zener diode 35; the collector of transistor 36 is connected to the positive input of the amplifier 21. The transistor 36 is fed by a voltage −V through a resistor 37 and is normally held in saturation by a voltage +V applied to the base through a resistor 38 and a Zener diode 35. The emitter of the transistor 36 is furthermore connected to ground through a diode 39.

When the transistor 36 is saturated (i.e., ON), its collector, and therefore the positive input of the amplifier 21, is substantially short-circuited to ground so that the amplifier 21 is blocked. When the signal 32 at the input 31 becomes negative for the time $t_1$ (FIG. 5), the transistor 36 is reverse biased (i.e., OFF). The signal coming from the filter 16 can now enter the amplifier 21. The maximum memorized by the circuit 20 is therefore the maximum of the signal during the time interval $t_1$. This maximum is determined by a dimension S1 which occurs during the time T1.

The output signal of the filter 16 is introduced moreover into a second circuit 40 which is substantially identical to the circuit 20. It comprises an operational amplifier 41 fed by the voltages +V and −V and to whose positive input the signal coming from the filter 16 is applied through a resistor 42. The output of amplifier 41 charges a capacitor 46 through a diode 44. The voltage at the capacitor 46 is applied to the input of an FET 48 which is fed by the voltages +V and −V and biased by a resistor 47. The FET 48 is connected in such a manner as to operate as a cathode follower and its output is connected to the negative input of the amplifier 41 through a feedback resistor 49 capable of assuring that the amplifier 41 has a gain of one.

If the signal at the input of the amplifier 41 increases, the capacitor 46 is charged practically to a value equal to that at the input, the gain of the amplifier 41 being one. When the signal at the input decreases, the absolute voltate value on the negative input of the amplifier 41 is made greater than that of the positive input since the capacitor 46 retains the charge corresponding to the preceding signal. The output of the amplifier 41 becomes negative and reverse biases the diode 44, preventing the capacitor 46 from discharging. It is therefore obvious that the capacitor 46 always memorizes the maximum value of the input signal.

The positive input of the amplifier 41 is controlled by a circuit 50 to whose input 51 there is applied a signal 52 (FIG. 5) coming from the aforementioned control unit (not shown). The signal 52, through a diode 54 and a Zener diode 55, is applied to the base of a transistor 56 whose collector is connected to the positive input of the amplifier 41. The transistor 56 is fed by a voltage −V through a resistor 57 and is normally held at saturation by a voltage +V applied to the base through a resistor 58 and the Zener diode 55. The emitter of the transistor 56 is moreover connected to ground through a diode 59.

When the transistor 56 is at saturation, its collector, and therefore the positive input of the amplifier 41, is substantially short-circuited to ground so that the amplifier 41 is blocked. When the signal 52 at the input 51 becomes negative for the time $t_2$, the transistor 56 is reverse biased. The signal coming from the filter 16 can now enter the amplifier 41. The maximum memorized by the circuit 40 is then the maximum of the signal during the time interval $t_2$. This maximum is individualized by a dimension $S_2$ which is detected at the moment $T_2$.

The two capacitors 26 and 46 are controlled by a circuit 66 having a signal 68 at its input which is applied to the base of a transistor 73 through a diode 71 and a Zener diode 72; transistor 73 is fed by the voltages +V and −V and biased by resistors 76, 77 and 78. The signal 68 normally maintains the transistor 73 in a reversed biased (or OFF) state which therefore maintains the collector at a positive voltage level. The two diodes 81 and 82 are accordingly reverse biased (blocked) and the capacitors 26 and 46 cannot discharge. When the signal 68, at the time $t_3$, becomes positive, the transistor 73 becomes saturated, practically short-circuiting its collector towards the voltage −V. The two diodes 81 and 82 start to conduct and discharge the capacitors 26 and 46, cancelling out the maxima which were previously memorized.

The signal at the output of the FET 48, namely the signal corresponding to the maximum memorized in the time $t_2$, is inverted by an operational amplifier 91 fed by the voltages +V and −V and biased on the positive input by a resistor 93. The amplifier 91 has a resistor 94 at its input and its output is fed back to its input through a resistor 96 equal to the resistor 94 so as to have a unit gain.

The output of the amplifier 91 and the output of the FET 28 are applied to a node 101 through two resistors 102 and 103 respectively. Thus the node 101 comprises the algebraic sum of the two signals which, the signal at the output of the FET 48 having been inverted, is the difference between the two maxima memorized on the capacitors 26 and 46.

The node 101 constitutes the input for an operational amplifier 106 fed by the voltages +V and −V and having a gain which is adjustable by means of a feedback potentiometer 107 to regulate the sensitivity of the system.

On the positive input of the amplifier 106, an adjustable voltage is introduced by a potentiometer 108 connected between the voltages +V and −V. By suitably regulating this voltage the balancing is effected between the various circuits so as to have a zero output on the amplifier 106 when the signal coming from the filter 16 is zero. The output of the amplifier 106 is introduced through a resistor 112 to the positive input of an operational amplifier 114, fed by the voltages +V and −V and biased by a resistor 115 connected between the negative input and ground.

The output of the amplifier 114 is applied, through two paths formed of a resistor 116 in series with a diode 117 and of a resistor 118 in series with a diode 119, respectively, to a capacitor 121 which is thus charged to the corrected value of the difference between the two maxima detected by the circuits 20 and 40 when the two diodes 117 and 119 are capable of conducting.

The voltage present on the capacitor 121 is applied to the input of an FET 124 fed by the voltages +V and −V and biased by a resistor 126. The output of the FET 124 is applied, through a feedback resistor 128, to the negative input of the amplifier 114 so that the output of the circuit portion comprising the amplifier 114, diodes 117, 119 and FET 124 has a gain equal to one.

Figure 5:
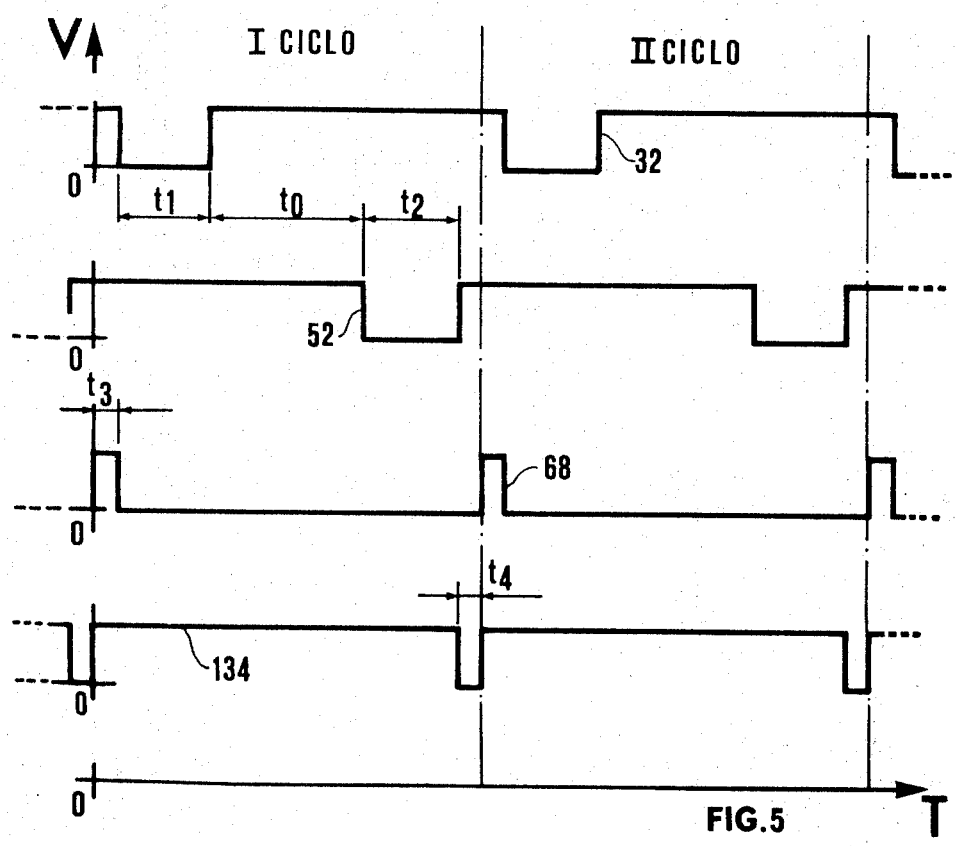
FIG. 5 shows a diagram of the operating cycle of the device of FIGS. 2 and 3.

The conduction of the diodes 117 and 119 is controlled by two circuits 131 and 132 to whose common input 133 a signal 134 is applied (FIG. 5). The circuit 131 comprises a transistor 136 fed by the voltages +V and −V, through by the resistors 137 and 138, and having its collector connected to the anode of the diode 117. The signal 134 reaches the base of the transistor 136 through a diode 141 and a Zener diode 142. The circuit 132 comprises a transistor 144 fed by the voltage +V and biased by the resistors 146, 147, 154 and 157. The signal 134 reaches the base of the transistor 144 through the diode 151 and a Zener diode 152. The collector of the transistor 144 is connected, through the resistor 154, to the base of the transistor 156 fed by the voltage +V. The collector of the transistor 156 finally is connected to the cathode of the diode 119.

The signal 134 is normally positive so that the transistors 136 and 144 are normally saturated. The collector of the transistor 136 is accordingly at a voltage level close to −V such as to hold the diode 117 blocked. Similarly the collector of the transistor 144 is at a voltage level such as to saturate the transistor 156 whose collector accordingly is brought to a voltage level close to +V. The diode 119 is thus blocked. Both the diodes 117 and 119 being blocked, the signal at the output of the amplifier 114 cannot pass to the capacitor 121, the value of whose charge thus remains unchanged.

When the signal 134 at the time $t_4$ drops to zero, the transistors 136 and 144 are reverse biased, as is the transistor 156. The anode of the diode 117 is brought to a positive voltage and the diode 117 therefore becomes conductive; similarly, the cathode of the diode 119 is brought to a negative voltage and the diode 119 also becomes conductive. Both the diodes 117 and 119 conducting, the capacitor 121 is charged to the voltage value present on the output of the amplifier 114.

The output of the FET 124 is fed to a node 160 at which there is then found a signal, continuously corrected, corresponding to the quantity of material removed on the average during a time $$(T=-T_1) = t_o + (t_1/2) + (t_2/2)$$

The signal present at the node 160, which is normally a signal of negative sign, is fed, in a preferred method of application of the above-mentioned device, through a resistor 161, to the positive input of an operational amplifier 162, fed by the voltages +V and −V, to whose negative input is applied the output of a potentiometer 164 connected between the voltage −V and ground and adjustable manually to a desired value. The amplifier 162 has at the output a resistor 167 and is provided with positive feedback by a resistor 166 in such a manner that as long as the voltage at its positive input is higher in absolute value than that of the negative input, the output is strongly negative; when the voltage at the positive input is less in absolute value than at the negative input, the output becomes strongly positive. In addition to the resistor 167, a Zener diode 168 and a diode 169 are connected in series to the output of amplifier 162 and constitute the input to the base of a transistor 171 fed by the voltage +V and biased by two resistors 172 and 173.

When the output of the amplifier 162 is negative, it is blocked by the diode 169 and practically short-circuited to ground by a diode 176. The transistor 171 is reverse biased and its collector is at a voltage close to +V. When the output of the amplifier 162 is positive, the transistor 171 becomes saturated. Its collector is therefore brought to a voltage substantially equal to ground voltage.

The output signal on the collector of the transistor 171 is introduced into a unit 178 for the control of the cycle of the machine, which is known per se and will not be described in detail. The cycle of the machine can be controlled also manually from the outside by sending in any known manner a suitable signal to an input 180. This signal, through the diode 169, is able to control the transistor 171 and therefore the cycle of the machine.

Summarizing, the device operates in the following manner;

The signal taken from the measurement member is introduced to the filter 16 which eliminates, at least in part, the oscillations of the measurement due to the irregularities of the workpiece.

At the start of each cycle the two capacitors 26 and 46 are discharged in the manner described above by means of the circuit 66. The capacitors 26 and 46 are thus ready to receive the new signal which is to be memorized.

The output of the filter 16 is introduced in a circuit 20 capable of memorizing the maximum of the input measurement on the capacitor 26. The circuit 20 is controlled by a circuit 30 which keeps it in operation for the period of time $t_1$ during which the measurement member is able to explore the entire surface of the workpiece.

The signal at the output of the filter 16 is introduced also into the circuit 40 which is held in operation for the period of time $t_2$ by the control circuit 50. The time $t_2$ is a predetermined interval of time $t_o$ from the time $t_1$. The maximum of the signal in the time $t_2$ is memorized on the capacitor 46.

This signal is inverted by the amplifier 91 and thereupon algebraically summed on the node 101 with the signal memorized on the capacitor 26. There is thus the difference between the two maxima which can be considered substantially to correspond to the material removed during the time $$T2 - T1 = t_o + (t_1/2) + (t_2/2)$$

At the time $t_4$ this signal is brought onto the memory formed of a capacitor 121 under the control of the circuits 131, 132. This signal is brought onto a node 160 and then can be introduced into an operational amplifier 162 and compared with a predetermined signal coming from a variable potentiometer 164 which supplies a signal corresponding to the minimum removal permissible during the time $t_o + t_1/2 + t_2/2$.

Finally, the output of the amplifier 162 determines the state of the transistor 171 which in its turn controls the unit 178 which controls the cycle of the machine. The cycle of the machine continues if the removal is greater than the predetermined level and is interrupted only if it drops to a lower level.

It is obvious that the various groups and circuits may be modified by additions or substitutions of parts without thereby going beyond the scope of the invention.

For example, the signal present at the node 160 can be fed to the input of several operational amplifiers regulated in such a manner as to control different commands of the cycle of the machine. The signal present at the node 160 can also be simply sent to an instrument indicating the value of the signal in order to permit manual control of the machine.

The actual extent of this invention is intended to be limited solely by the claims set forth hereinafter.

I claim:

1. Apparatus for determining the speed of chip or stock removal in a grinding machine provided with measuring means for supplying electrical signals responsive to the dimension of a piece being machined, comprising:
   first memory means for storing a first signal representing a first measured dimension of said workpiece measured by said measuring means,
   second memory means for storing a second signal representing a second measured dimension of said workpiece measured by said measuring means a pre-determined time interval after said first dimension has been measured,
   means for obtaining a difference signal which is the difference between the first and second signals stored in said first and second memory means,
   third memory means for storing said difference signal, and
   control circuit for updating said first, second and third memory means.

2. The apparatus according to claim 1, wherein said first and second memory means respectively store signals representing the maximum values of said first and second dimensions measured by said measuring means in first and second periods of time sufficient to permit said measuring member to explore the entire surface of the piece, said difference signal being independent of the point of removal of the measurement and corresponding to the quantity of material removed.

3. The apparatus according to claim 2, wherein each of said first and second memory means comprises a capacitor, an operational amplifier having an output connected to said capacitor for charging same, and a diode in series with said operational amplifier and said capacitor; and further comprising means to cyclically discharge said capacitor prior to storing a new maximum value signal in said capacitor.

4. The apparatus according to claim 3, further comprising means connected to the input of each said operational amplifier for controlling the period of time during which said first and second signals are applied to said first and second memory means, respectively.

5. The apparatus according to claim 1, further comprising comparing means for comparing said difference signal and an adjustable predetermined signal; control means controlling the cycle of the machining of said workpiece; and means applying the output of said comparing means to said control means.

6. The apparatus according to claim 1, further comprising means for indicating said difference signal.

* * * * *

UNITED STATES PATENT OFFICE
CERTIFICATE OF CORRECTION

Patent No. 3,785,091                     Dated January 15, 1974

Inventor(s)    Mario Pozzetti

It is certified that error appears in the above-identified patent and that said Letters Patent are hereby corrected as shown below:

[73] Change "de" to --di--;

[30] Change "3312/71 to --3312A/71--;

Column 1, line 16, change "verfication" to --verification--;

Column 1, line 32, change "undersirably" to --undesirably--;

Column 1, line 40, change "certin" to --certain--;

Column 3, line 43, change '"voltate" to --voltage--;

Column 5, line 42, change "$(T=-T_1)$" to --$(T-T_1)$--;

Fig. 5, change "I CICLO" to -- 1 CYCLE--; change "II CICLO" to --11 CYCLE--.

Signed and sealed this 3rd day of September 1974.

(SEAL)
Attest:

McCOY M. GIBSON, JR.
Attesting Officer

C. MARSHALL DANN
Commissioner of Patents